March 2, 1971  ÖYVIND JENSEN  3,567,269
COUPLING DEVICE FOR CONNECTING THE WIRE WITH THE INNER
CORE TUBE IN WIRE LINE CORE DRILLS
Filed June 25, 1969  3 Sheets-Sheet 1

United States Patent Office 3,567,269
Patented Mar. 2, 1971

3,567,269
COUPLING DEVICE FOR CONNECTING THE WIRE WITH THE INNER CORE TUBE IN WIRE LINE CORE DRILLS
Öyvind Jensen, Stockholm, Sweden, assignor to Atlas Copco Aktiebolag, Nacka, Sweden
Filed June 25, 1969, Ser. No. 836,331
Claims priority, application Sweden, July 2, 1968, 9,108/68
Int. Cl. E21b 31/00
U.S. Cl. 294—86.14
4 Claims

ABSTRACT OF THE DISCLOSURE

This invention relates to a coupling device for connecting the wire with the inner core tube in wire line core drills, including a locking mechanism comprising at least one lever, one arm of which is intended to engage with a gripper means attached to said wire.

---

The present invention relates to a device in wire line core drills for connecting the wire with the inner core tube, the device having a gripper head attached to one of said two parts to be connected with each other, and a locking device attached to the other of said two parts.

In exploratory drilling for picking up species of stone samples from a depth ranging between several hundred to a few thousand meters so called double core tubes are used, including an inner tube and an outer tube. The sample is picked up in the inner tube, the length of which usually is a few meters. When the inner tube has been filled, this is detected by a manometer measuring the flushing water pressure in the core tube. A catching device attached to a wire is lowered to pick up the inner tube together with the sample, the catching device including a catching claw which is intended to engage a gripper means attached to the upper end of the inner tube. Upon stretching the wire the inner tube looses its engagement with the outer tube to enable the inner tube to be lifted. Inversely, the catching claw and the gripper means may be used for lowering a new inner tube.

The known devices for catching and gripping as well as lowering the inner tube in wire line core drills have a complicated structure, resulting in expensive manufacturing. The object of the present invention is to simplify the structure of such devices.

In accordance with the invention there is provided a device for wire line core drills for connecting a means attached to a wire with an inner core tube, said device including a gripper head attached to one of said parts to be connected with each other, and a locking device attached to the other of said parts, characterized in that the locking device consists of at least one lever journalled on a shaft pivot disposed across the drill shaft, said lever being mounted on the upper end of the inner core tube and comprising at least two arms, viz a first arm directed upwards and when lowering the wire intended to be swung to a locking engagement with the gripper head which is fastened to the wire, the wire thereby lifting the inner core tube via the lever and the shaft pivot and a second arm which during drill operations is intended to hinder any upward movement of the inner core tube, where as upon swinging the lever to a locking engagement between the up arm and the gripper head said second arm releases the inner core tube for enabling same to be lifted.

The invention will now be described in more detail, by way of example, with reference to the drawing, illustrating schematically embodiments of the invention. In all embodiments shown and described the tubes and housings may be joined by screw threading.

Figure 1:
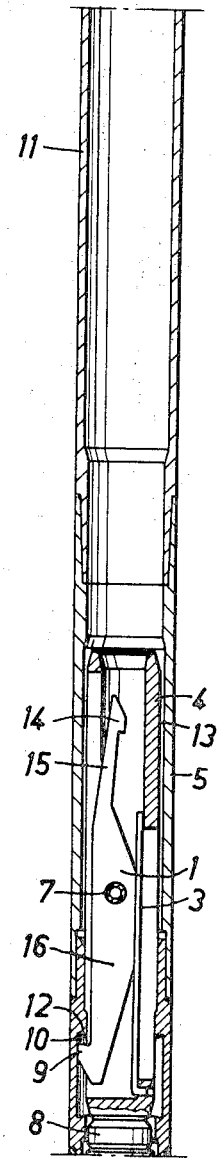
FIG. 1 illustrates the coupling device the locking device being in engagement with the outer core tube.

FIG. 1 shows the locking device comprising a double-armed lever 1 provided with a first arm 15 directed upwards and provided with an abutment 14, and a second arm 16 directed downwards and provided with an abutment 9. The locking device further consists of a gripper head 2, an outer tube 5, an inner tube 6, a wire spring 3, a locking device housing 4, a horizontal locking device shaft pivot 7, a rubber ring 8 joining the inner core tube with the housing 4, and a drilling tube 11 joining the core tube with the drill driving equipment.

When the locking device 1, as in shown in FIG. 1, hinders the upward movement of the inner tube 6 the horizontal abutment 9 of the lower locking device arm is in engagement with a corresponding recess 10 on the inside face of the outer tube 5 prior to drill start. The abutment 9 simultaneously locks the inner tube to the outer tube, so that the upper portion of the inner tube follows the rotation of the outer tube during drilling. The lower portion of the inner tube together with a core catcher ring and a core catcher sleeve is joined to the upper portion through a bearing (not shown). One side of the lower arm opposite to the abutment 9 is bevelled to be able to be swung on the shaft pivot 7 towards the spring 3. The locking device is held in locked position, see FIG. 1, by the wire spring 3 which biases the second arm 16 and which urges the abutment 9 into the recess 10 since the force of gravity of the abutting surface between the locking device and the spring acts beneath the centre of motion 7 of the locking device. The locking device has the position shown in FIG. 1, when the device is ready for drill start. Flushing water is supplied through flushing channel 13 between the inner and the outer tubes. During drilling the abutment 9 will be displaced towards the recess abutment 12. A spring package (not shown) with a predetermined biasing will—upon exceeding of said biasing when the core bottoms in the inner tube—be compressed causing the rubber ring 8 to be urged outwards to seal against the outer tube, thereby blocking the flushing water feed, the pressure in the manometer associated with the flushing water conduct thereby increases.

Figure 2:
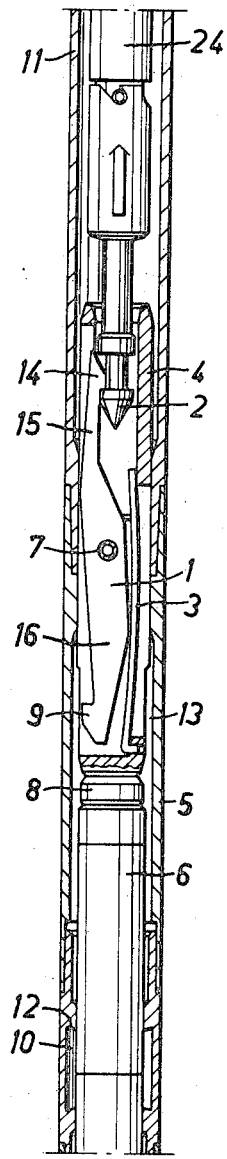
FIG. 2 shows the coupling device illustrating how the gripper means together with the inner core tube is gripped and lifted by the gripper head.

During lifting and lowering the inner tube the gripper head 2 on the lowermost end of the wire is in engagement with the abutment 14 on the end of the upper arm 15 of the locking device 1, as is shown in FIG. 2. The side of the arm which faces the outer tube is bevelled to be able to be turned on the shaft pivot 7 towards the outer tube. In order to enable the gripper head to more easily engage the abutment 14 the inward-turned side of the abutment is bevelled. The abutment 14 is urged against the head 2 by the force exerted by the spring 3 against the lower arm of the locking device 1. The torsional moment of the spring 3 in regard to the centre of motion 7 is in this case much greater than in FIG. 1. Besides the abutting force is greater since the spring 3 is biased.

During lowering the gripper head 2 in the boring tube the removal of the abutment 14 is facilitated by a weight 24 of massive steel attached to the lowermost end of the wire.

Figure 3:
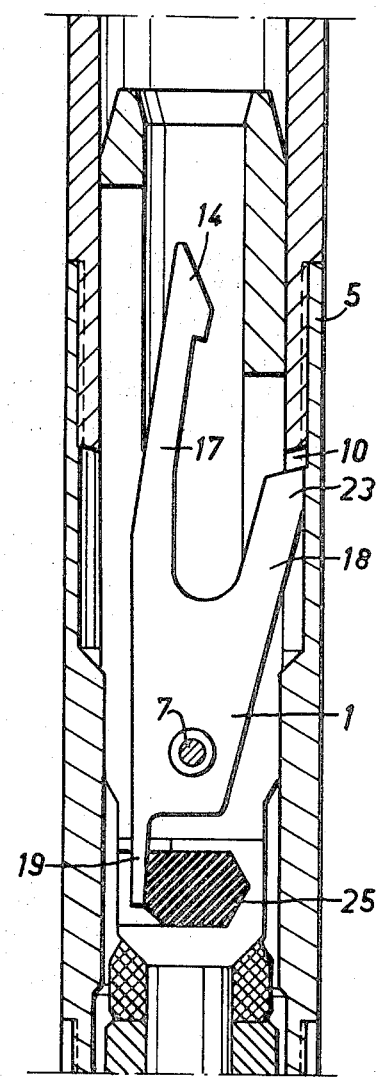
FIGS. 3 and 4 show two other embodiments of the coupling device in accordance with the invention with modified locking devices.
Figure 4:
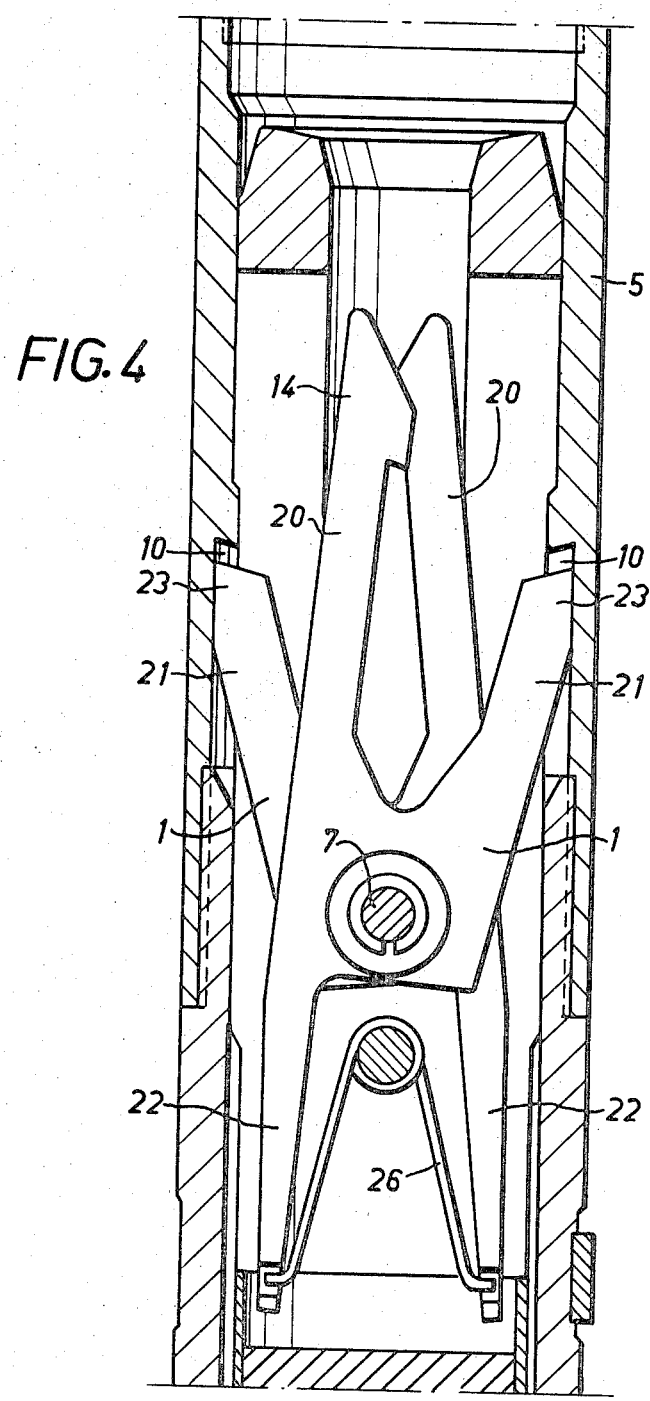

FIGS. 3 and 4 show two other embodiments of the coupling device in accordance with the invention with modified locking devices. In accordance with FIG. 3 the locking device consists of the lever 1 with an arm 17 directed upwards and provided with an abutment 14, the second arm 18 being directed upwards and provided with an abutment 23 which prior to drill start is intended to engage a corresponding recess 10 on the inner surface of the outer tube 5 to hinder any upward movement of the inner core tube. The lever is also provided with a third arm 19 directed upwards, a resilient means 19 being disposed to engage the third arm 19 and to urge the abutment 23 of the second arm 18 into the recess 10.

In accordance with FIG. 4 the locking device consists of two levers 1 disposed in reversed relation and journalled on the shaft pivot 7, said levers having each a first arm 20 and a second arm 21, respectively, directed upward, and having each a third arm 22 directed downwards. A resilient means 26 is intended to urge the down arms 22 apart from each other and thereby urge the two up arms 21 with abutments 23 into two corresponding recesses 10 on the inner face of the outer tube 5.

The invention is not limited to the embodiments shown and described but covers any other embodiment within the scope of the invention.

What is claimed is:

1. In wire line core drills of the type including an outer core tube, a wire having a gripper head attached thereto operatively arranged to be lowered and raised within said outer core tube, an inner core tube, and a locking device for selectively completing locking engagement between said gripper head and said inner core tube, said locking device comprising a first locking arm operatively arranged for movement in a prescribed direction between an engaged position and a disengaged position relative to said gripper head, a second locking arm similarly operatively arranged for movement in a second prescribed direction between an engaged position and a disengaged position relative to a locking notch on said outer core tube, and means for pivotally mounting said first and second locking arms so that said first locking arm is moving into said engaged position thereof while said second locking arm is moving into said disengaged position thereof and vice versa, whereby during engagement of said first locking arm and said gripper head said second locking arm is disengaging from said outer core tube and vice versa.

2. A locking device in wire line core drills as defined in claim 1 wherein said first and second locking arms are integral parts of a lever mounted on said inner core tube.

3. A locking device in wire line core drills as defined in claim 2 wherein said first and second locking arms are each part of a separate lever mounted on said inner core tube.

4. A locking device in wire line core drills as defined in claim 2 wherein said first locking arm is on the proximal end of said lever and said second locking arm is on the distal end thereof.

References Cited
UNITED STATES PATENTS

| | | | |
|---|---|---|---|
| 1,442,188 | 1/1923 | Stokes | 294—86.17 |
| 1,719,144 | 7/1929 | Stokes | 294—86.29 |
| 3,199,907 | 8/1965 | Braun | 294—86.33 |

EVON C. BLUNK, Primary Examiner

A. N. GOODMAN, Assistant Examiner

U.S. Cl. X.R.

294—86.2